(12) United States Patent  
Hayama

(10) Patent No.: US 9,133,389 B2  
(45) Date of Patent: Sep. 15, 2015

(54) LIGHT GUIDE STRUCTURE AND ILLUMINATING DEVICE

(71) Applicant: Empire Technology Development LLC, Wilmington, DE (US)

(72) Inventor: Hidekazu Hayama, Osaka (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 28 days.

(21) Appl. No.: 13/988,304

(22) PCT Filed: Oct. 31, 2012

(86) PCT No.: PCT/JP2012/006997  
§ 371 (c)(1),  
(2) Date: May 17, 2013

(87) PCT Pub. No.: WO2014/068622  
PCT Pub. Date: May 8, 2014

(65) Prior Publication Data  
US 2014/0119052 A1     May 1, 2014

(51) Int. Cl.  
    *C09K 11/06*     (2006.01)  
    *F21V 8/00*     (2006.01)

(52) U.S. Cl.  
    CPC .............. *C09K 11/06* (2013.01); *G02B 6/0003* (2013.01); *G02B 6/0043* (2013.01); *G02B 6/0055* (2013.01); *G02B 6/0061* (2013.01)

(58) Field of Classification Search  
CPC ........ G02B 1/045; G02B 6/0011; G02B 6/00; G02B 6/0001; G02B 6/0003; G02B 6/0061; G02B 6/0043; G02B 6/0055; G02F 1/133617; G02F 2001/133614; Y02B 20/181; C09K 11/06; C09K 11/00  
See application file for complete search history.

(56) References Cited

U.S. PATENT DOCUMENTS

| | | | | |
|---|---|---|---|---|
| 5,422,040 | A | * | 6/1995 | Maofu et al. ............ 252/301.4 P |
| 5,714,835 | A | * | 2/1998 | Zachau et al. ................ 313/486 |
| 6,139,162 | A | * | 10/2000 | Masaki ......................... 362/618 |
| 6,843,937 | B1 | | 1/2005 | Kiguchi et al. |
| 7,586,559 | B2 | | 9/2009 | Minoura et al. |
| 8,182,128 | B2 | | 5/2012 | Meir et al. |
| 8,272,758 | B2 | | 9/2012 | Meir et al. |
| 8,545,721 | B2 | * | 10/2013 | Shim ........................ 252/301.36 |
| 2005/0049368 | A1 | | 3/2005 | Maruyama et al. |

(Continued)

FOREIGN PATENT DOCUMENTS

| | | |
|---|---|---|
| CN | 1220404 | 6/1999 |
| CN | 1591058 A | 9/2005 |

(Continued)

OTHER PUBLICATIONS

International Search Report and Written Opinion dated Jan. 29, 2013 in International Application No. PCT/JP2012/006997.

(Continued)

*Primary Examiner* — Bao Q Truong  
(74) *Attorney, Agent, or Firm* — Knobbe, Martens, Olson & Bear, LLP

(57) ABSTRACT

Light guide structures having a transparent member containing at least one red fluorescent transparent substance, at least one green fluorescent transparent substance, and at least one blue fluorescent transparent substance are disclosed.

19 Claims, 20 Drawing Sheets

(56) References Cited

U.S. PATENT DOCUMENTS

| | | | |
|---|---|---|---|
| 2005/0058770 A1 | 3/2005 | Kiguchi et al. | |
| 2007/0292631 A1 | 12/2007 | Shinozaki et al. | |
| 2009/0161341 A1 | 6/2009 | Meir et al. | |
| 2010/0002414 A1 | 1/2010 | Meir et al. | |
| 2010/0142189 A1 | 6/2010 | Hong et al. | |
| 2011/0176328 A1* | 7/2011 | Anandan et al. | 362/606 |
| 2012/0002137 A1* | 1/2012 | Saito et al. | 349/64 |
| 2012/0313045 A1* | 12/2012 | Shim | 252/301.36 |
| 2013/0308292 A1* | 11/2013 | Lin et al. | 362/84 |
| 2013/0308338 A1* | 11/2013 | Lin et al. | 362/609 |

FOREIGN PATENT DOCUMENTS

| | | | |
|---|---|---|---|
| CN | 101371074 | | 2/2009 |
| CN | 102473824 A | | 5/2012 |
| EP | 892028 | | 1/1999 |
| EP | 1394236 | | 3/2004 |
| EP | 1512723 | | 3/2005 |
| EP | 1978300 | | 10/2008 |
| JP | 63-54465 | | 3/1988 |
| JP | 11-54270 | | 2/1999 |
| JP | 2003-036714 | | 2/2003 |
| JP | 2005-96421 | | 4/2005 |
| JP | 2006-108076 | | 4/2006 |
| JP | 2009016289 | * | 1/2009 |
| JP | 2011-040664 | | 2/2011 |
| JP | 4709230 B | | 6/2011 |
| JP | 2011-203487 | | 10/2011 |
| JP | 2012-182009 | | 9/2012 |
| WO | WO 2007/083805 | | 7/2007 |
| WO | WO 2008/027773 | | 3/2008 |

OTHER PUBLICATIONS

Yeh, Yi-Yen 2001 "The Luminescence Properties of Diketonato-Europium Complexes" *Dissertation Thesis from National Sun Yat-sen University, TW*; in 182 pages.

* cited by examiner

LIGHT GUIDE STRUCTURE AND ILLUMINATING DEVICE

CLAIM FOR PRIORITY

This application is the U.S. national phase entry under 35 U.S.C. §371 of PCT/JP2012/006997, filed Oct. 31, 2012, the entire disclosure of which is hereby incorporated by reference herein.

BACKGROUND

Reflective displays, such as liquid crystal displays, require a light guide structure to emit white light toward their display panel. One conventional light guide structure is configured such that yellow fluorescent substances are excited by blue light emitted from a blue LED. This structure mixes yellow light from the yellow fluorescent substances with the blue light from the blue LED to produce white light. In this conventional structure, it is difficult to find a proper balance between the blue light and the yellow light. This can easily result in color unevenness. Another problem with this conventional structure is low color purity, because the produced white light is pseudo white light based on the combination of the blue light and the yellow light. Yet another problem is that when the yellow fluorescent substances are not transparent, the non-transparent fluorescent substances act as scattering particles. This makes it difficult to propagate excited light within the light guide structure from an edge of one side to an edge of an opposite side. In view of this, expectations for a light guide structure configured to emit white light with a high level of color purity have increased in recent times.

SUMMARY

In accordance with one embodiment, a light guide structure emitting white light with a high level of color purity is provided. The light guide structure comprises a transparent member containing at least one red fluorescent transparent substance, at least one green fluorescent transparent substance, and at least one blue fluorescent transparent substance.

In accordance with another embodiment, an illuminating device comprising a light source and the light guide structure is provided. The light source is configured to emit ultraviolet light to excite the red, green, and blue fluorescent transparent substances.

In accordance with yet another embodiment, a method of manufacturing a transparent fluorescent substance for white light emission is provided.

DETAILED DESCRIPTION

Figure 1:
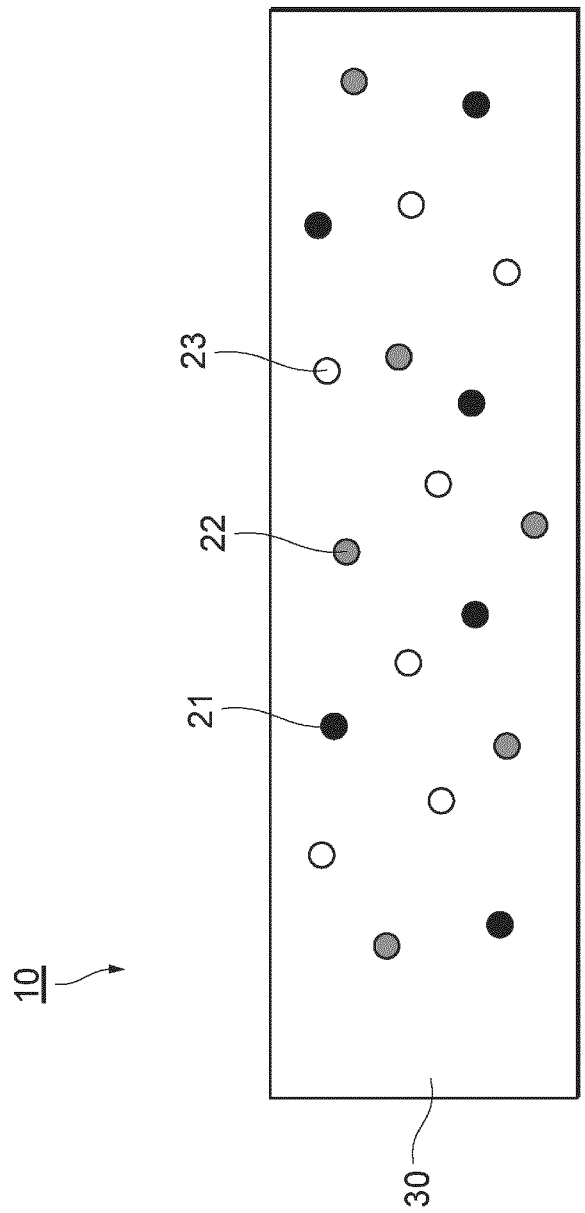
FIG. 1 shows a schematic view of a light guide structure in accordance with an embodiment of the present disclosure.

A light guide structure according to an embodiment described herein may be provided with a transparent member containing at least one red fluorescent transparent substance, at least one green fluorescent transparent substance, and at least one blue fluorescent transparent substance. A combination of red light emitted from the at least one red fluorescent transparent substance, green light emitted from the at least one green fluorescent transparent substance, and blue light emitted from the at least one blue fluorescent transparent substance can produce white light with superior color purity.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows a schematic view of a light guide structure 10 in accordance with an embodiment of the present disclosure. The light guide structure 10 may be provided with a transparent member 30 containing one or more red fluorescent transparent substances 21, one or more green fluorescent transparent substances 22, and one or more blue fluorescent transparent substances 23. The red, green, and blue fluorescent transparent substances 21, 22, and 23 may be uniformly combined throughout the transparent member 30 so as to enable the transparent member 30 to emit white light in response to light applied thereto. The applied light may have a wavelength to excite the red, green, and blue fluorescent transparent substances 21, 22, and 23. With this structure, a combination of red light emitted from the red fluorescent transparent substance 21, green light emitted from the green fluorescent transparent substance 22, and blue light emitted from the blue fluorescent transparent substance 23 can produce the white light with superior color purity. Due to the red, green, and blue fluorescent transparent substances 21, 22, and 23 being uniformly mixed throughout the transparent member 30, the light guide structure 10 can emit the white light having a substantially uniform luminance distribution.

In one non-limiting aspect of the present disclosure, rare-earth complexes or fluorescent organic dyes may be used for the red, green, and blue fluorescent transparent substances 21, 22, and 23.

For example, europium complexes may be used for the red fluorescent transparent substance 21. For ligands coordinated to europium ions, chemical compounds having a phosphate group, such as trimethyl phosphate, triethyl phosphate, tri-n-butyl phosphate, triphenyl phosphate, or tritolyl phosphate, and chemical compounds having a carbonyl group, such as thenoyltrifluoroacetone, naphthoyltrifluoroacetone, benzoyltrifluoroacetone, methylbenzoyltrifluoroacetone, furoyltrifluoroacetone, pivaloyltrifluoroacetone, hexafluoroacetylacetone, trifluoroacetylacetone, or fluoroacetylacetone, may be used. For the purpose of improving the luminous efficiency of the red fluorescent transparent substance 21, the tri-n-butyl phosphate may be used as the ligand having a phosphate group, and also the thenoyltrifluoroacetone may be used as the ligand having a carbonyl group.

For example, terbium complexes may be used for the green fluorescent transparent substance 22. For ligands coordinated to terbium ions, chemical compounds having a phosphate group, such as trimethyl phosphate, triethyl phosphate, tri-n-butyl phosphate, triphenyl phosphate, or tritolyl phosphate, and chemical compounds having a carbonyl group, such as thenoyltrifluoroacetone, naphthoyltrifluoroacetone, benzoyltrifluoroacetone, methylbenzoyltrifluoroacetone, furoyltrifluoroacetone, pivaloyltrifluoroacetone, hexafluoroacetylacetone, trifluoroacetylacetone, or fluoroacetylacetone, may be used. For the purpose of improving the luminous efficiency of the green fluorescent transparent substance 22, the tri-n-butyl phosphate may be used as the ligand having a phosphate group, and also the thenoyltrifluoroacetone may be used as the ligand having a carbonyl group.

For example, a fluorescent organic dye, such as dibromoanthracene, which has a small Stokes shift, can be used for the blue fluorescent transparent substance 23, because there is a small difference between an excitation wavelength of the blue fluorescent transparent substance 23 and an emission wavelength of the blue fluorescent transparent substance 23. Besides the above, bis-(triazinylamino-)stilbenedisulfonic acid derivative, bis stilbiphenyl derivative, 9,10-Dibromoanthracene, bis(triazinylamino-)stilbenedisulfonic acid derivative, bis stilbiphenyl derivative, 2,5-bis(5-tert-butyl-2-benzoxazolyl)thiophene, tris(2-(2,4-difluorophenyl)pyridinate)iridium(III), bis(2-(2,4-difluorophenyl)pyridinate)picolinic acid iridium(III), tris(3,4,7,8-tetramethyl-1,10-phenantrolinato)iridium(III), or ris(2,9-dimethyl-4,7-diphenyl-1,10-phenanthrolinato)iridium(III), may be used for the blue fluorescent transparent substance 23.

Table 1 shows the optical characteristics of PMMA (polymethyl methacrylate), PC (polycarbonate), COP (cycloolefin polymer), PET (polyethylene terephthalate), and TAC (triacetyl cellulose). These transparent resins may be used for preparing the transparent member 30.

TABLE 1

| Optical Characteristics | | PMMA | PC | COP | PET | TAC |
|---|---|---|---|---|---|---|
| Weight | Specific gravity | 1.17-1.2 | 1.2 | 1.01-1.08 | 1.4 | 1.3 |
| Optical isotropy | Birefringence [nanometers] | <20 | <90 | <20 | — | — |
| Transparency | Light transmissibility [%] | 93 | 89 | 91-93 | 89 | 92 |
| Dimension stability | Contraction percentage [%] | 0.3-0.7 | 0.5-0.7 | 0.5-0.7 | — | — |
| Burning resistance | Linear expansion coefficient [1/Kelvin] | $7 * 10^{-5}$ | $7 * 10^{-5}$ | $7 * 10^{-5}$ | $1.5 * 10^{-5}$ | — |
| | Glass-transition temperature [degrees Celsius] | 93 | 150 | 120-165 | — | — |
| | Deflection temperature under load [degrees Celsius] | 74-99 | 121-140 | 110-162 | — | — |
| Flexure strength | Bending strength [MPa] | 140 | 100 | 80-135 | — | — |
| Water absorbability | Water absorption coefficient [%] | 0.3 | 0.15 | <0.01 | 0.4 | 7 |
| Dielectric constant | Relative permittivity | 2.6 | 3 | 2.3 | 3.2 | — |
| Surface hardness | Pencil hardness | 3H | 2B-B | H | H | — |

Figure 2:
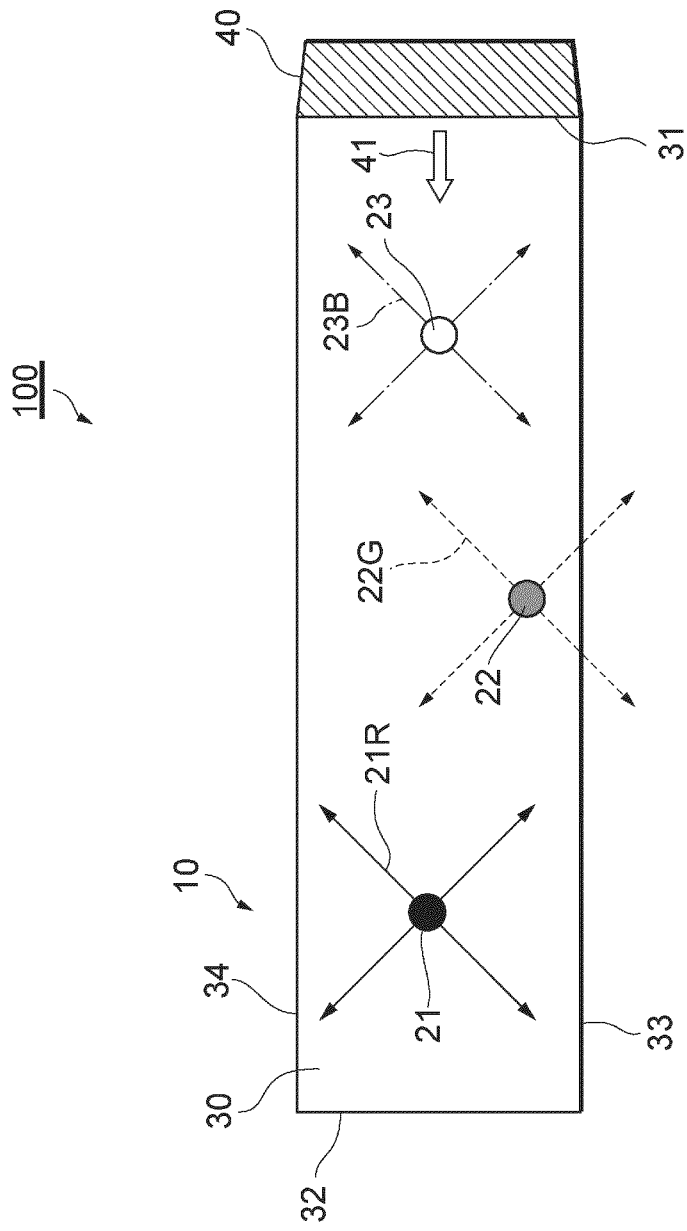
FIG. 2 shows a schematic view of an illuminating device in accordance with an embodiment of the present disclosure.

FIG. 2 shows a schematic view of an illuminating device 100 in accordance with an embodiment of the present disclosure. The illuminating device 100 may be provided with a light source 40 configured to emit light 41 and the light guide structure 10 configured to guide the light 41 emitted by the light source 40. The light source 40 may be arranged on one side edge 31 of the light guide structure 10. The light guide structure 10 guides the light 41 from the side edge 31 to an opposite side edge 32 thereof. Due to the red, green, and blue fluorescent transparent substances 21, 22, and 23 being transparent, the light 41 can propagate from the side edge 31 to the opposite side edge 32 through the transparent member 30 without being scattered by the red, green, and blue fluorescent transparent substances 21, 22, and 23.

The light source 40 may be provided with a light emitting diode configured to emit ultraviolet light having a wavelength (e.g., 375 nanometers) to excite the red, green, and blue fluorescent transparent substances 21, 22, and 23. As shown in FIG. 2, the red light 21R emitted from the red fluorescent transparent substance 21, the green light 22G emitted from the green fluorescent transparent substance 22, and the blue light 23B emitted from the blue fluorescent transparent substance 23 can be uniformly combined to produce the white light having superior color purity.

The illuminating device 100 can be used for backlight sources for reflective displays, such as liquid crystal displays, liquid crystal televisions, e-paper, or interferometric modulation displays. Due to the light 21R, 22G, and 23B emitted from the red, green, and blue fluorescent transparent substances 21, 22, and 23 propagating in all directions therefrom and thus acting as substantially diffused light, when the illuminating device 100 is used as a backlight source for liquid crystal displays, a diffusion sheet that is normally used as a backlight source for liquid crystal displays may be omitted. Alternatively, the illuminating device 100 can be used for planar light sources.

Figure 3:
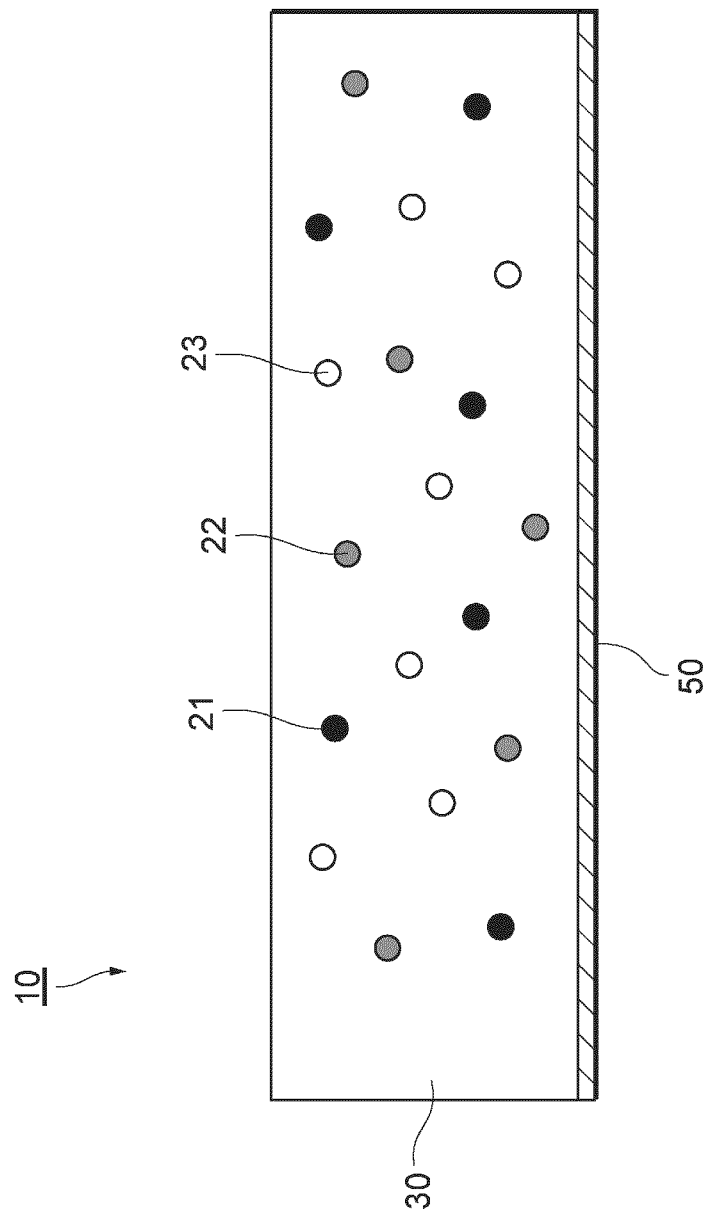
FIG. 3 shows a schematic view of a light guide structure in accordance with an embodiment of the present disclosure.
Figure 4:
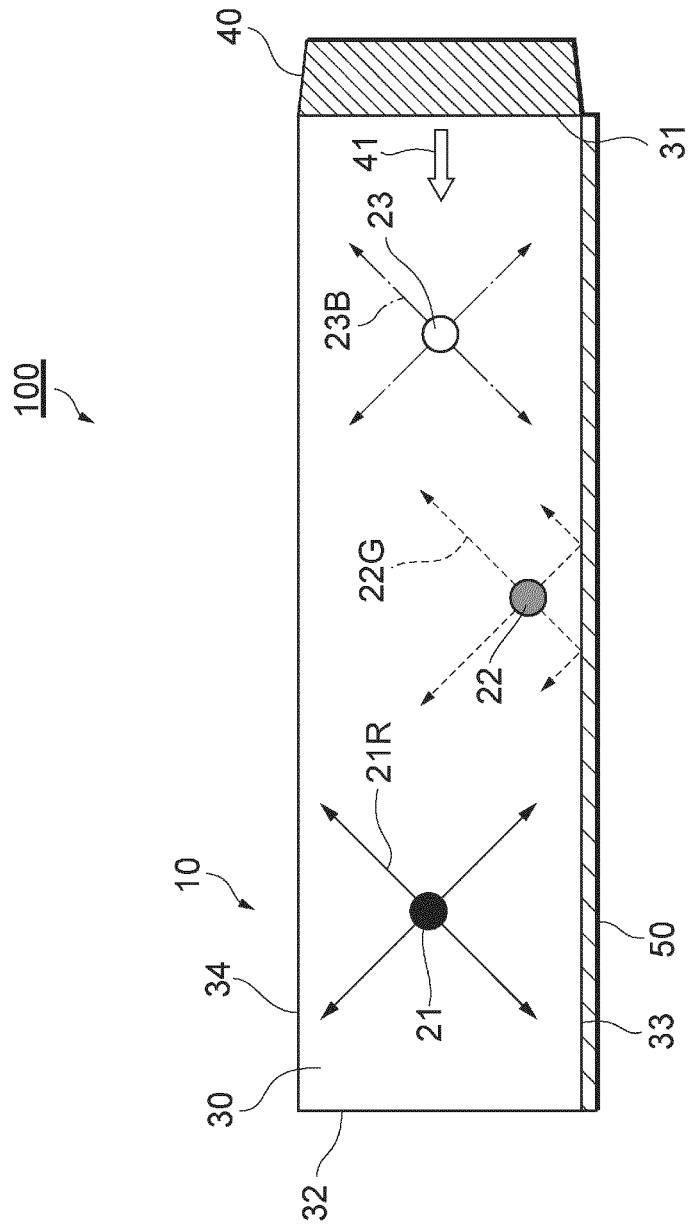
FIG. 4 shows a schematic view of an illuminating device in accordance with an embodiment of the present disclosure.

As shown in FIGS. 3 and 4, the light guide structure 10 may be provided with a reflection layer 50 arranged on a back surface 33 of the transparent member 30. Due to the red, green, and blue fluorescent transparent substances 21, 22, and 23 emitting the light 21R, 22G, and 23B in all directions, the light 21R, 22G, and 23B reaches the reflection layer 50 and is then reflected from the reflection layer 50 onto a light emission surface 34 of the transparent member 30. In this way, the reflection layer 50 approximately doubles the luminance at the light emission surface 34. The reflection layer 50 may have a mirrored surface. The mirrored surface may be formed by metal deposition such as aluminum deposition.

Figure 5:
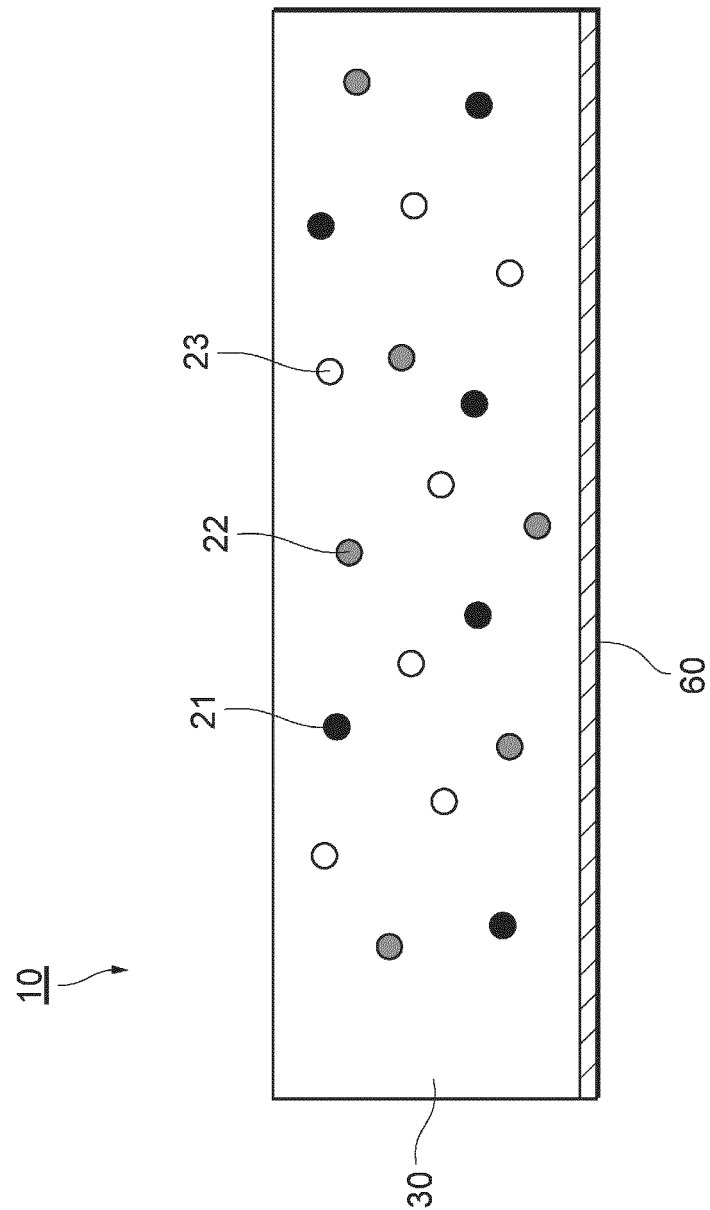
FIG. 5 shows a schematic view of a light guide structure in accordance with an embodiment of the present disclosure.
Figure 6:
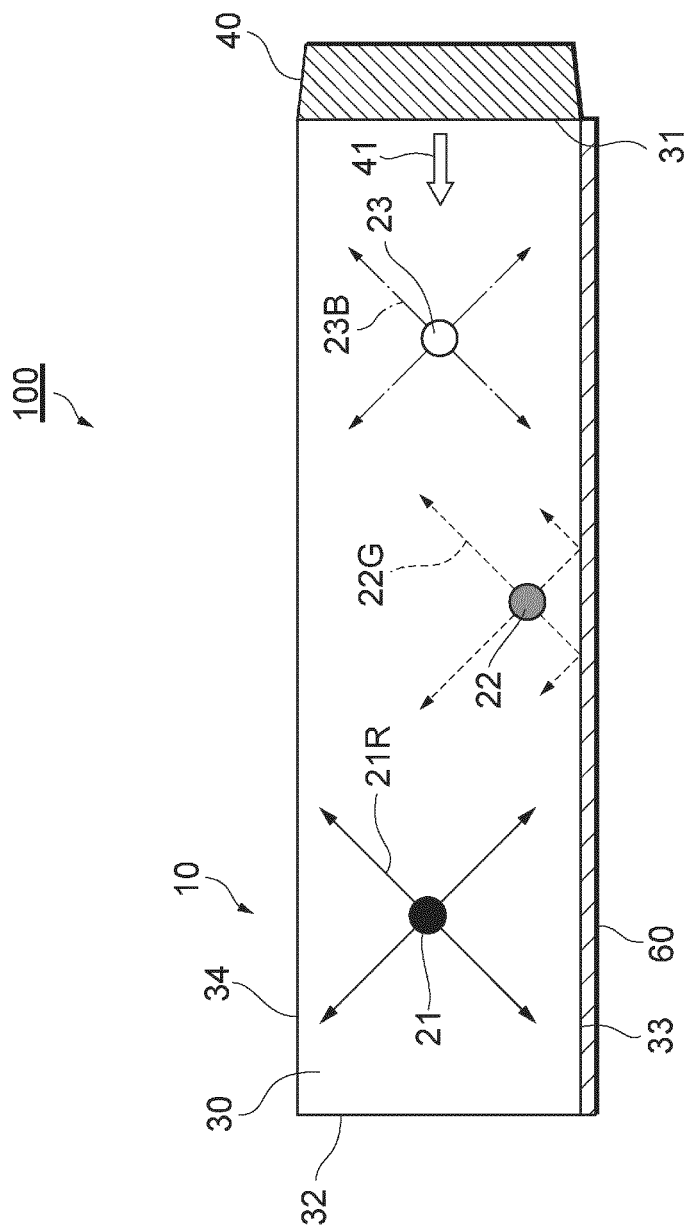
FIG. 6 shows a schematic view of an illuminating device in accordance with an embodiment of the present disclosure.

Alternatively, as shown in FIGS. 5 and 6, the light guide structure 10 may be provided with a diffuse reflection layer 60 instead of the reflection layer 50. Due to the red, green, and blue fluorescent transparent substances 21, 22, and 23 emitting the light 21R, 22G, and 23B in all directions, the light 21R, 22G, and 23B reaches the diffuse reflection layer 60 and is then reflected and diffused at the diffuse reflection layer 60. One advantage of the diffuse reflection layer 60 is that the diffused light 21R, 22G, and 23B can prevent objects surrounding the light guide structure 10 from being reflected even when the light guide structure 10 is used as a backlight source for reflective displays. Another advantage is that, of the light 21R, 22G, and 23B emitted from the red, green, and blue fluorescent transparent substances 21, 22, and 23 in all directions, light having angles larger than a critical angle, even when propagating to edge portions of the light guide structure 10, can be guided to the light emission surface 34. In this way, the diffuse reflection layer 60 approximately quadruples the luminance at the light emission surface 34. The diffuse reflection layer 60 may be formed of white paint such as titanium oxide.

Figure 7:
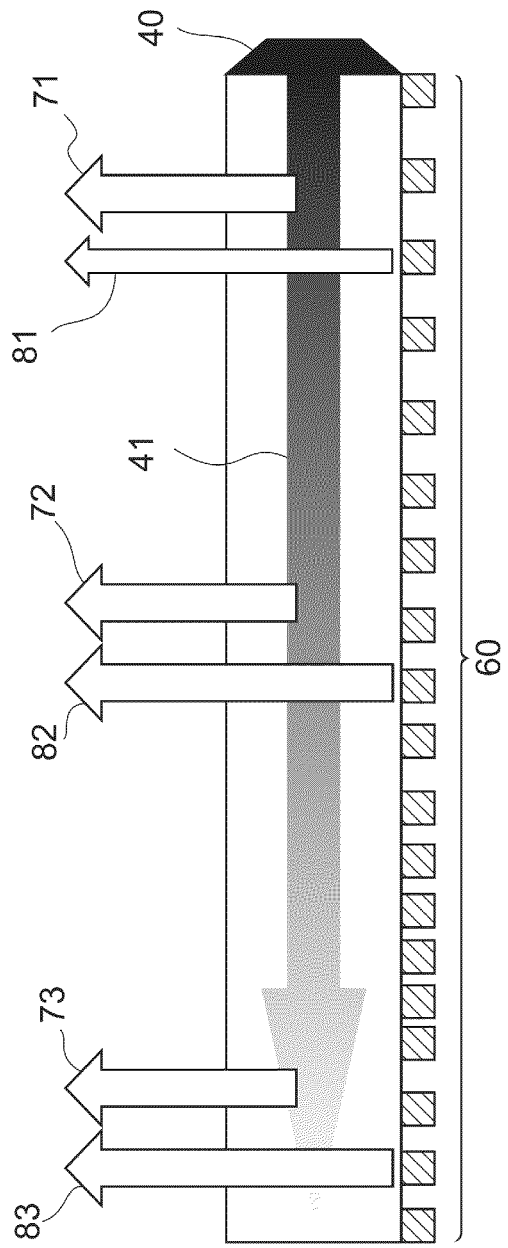
FIG. 7 shows a schematic view of an illuminating device in accordance with an embodiment of the present disclosure.
Figure 8:
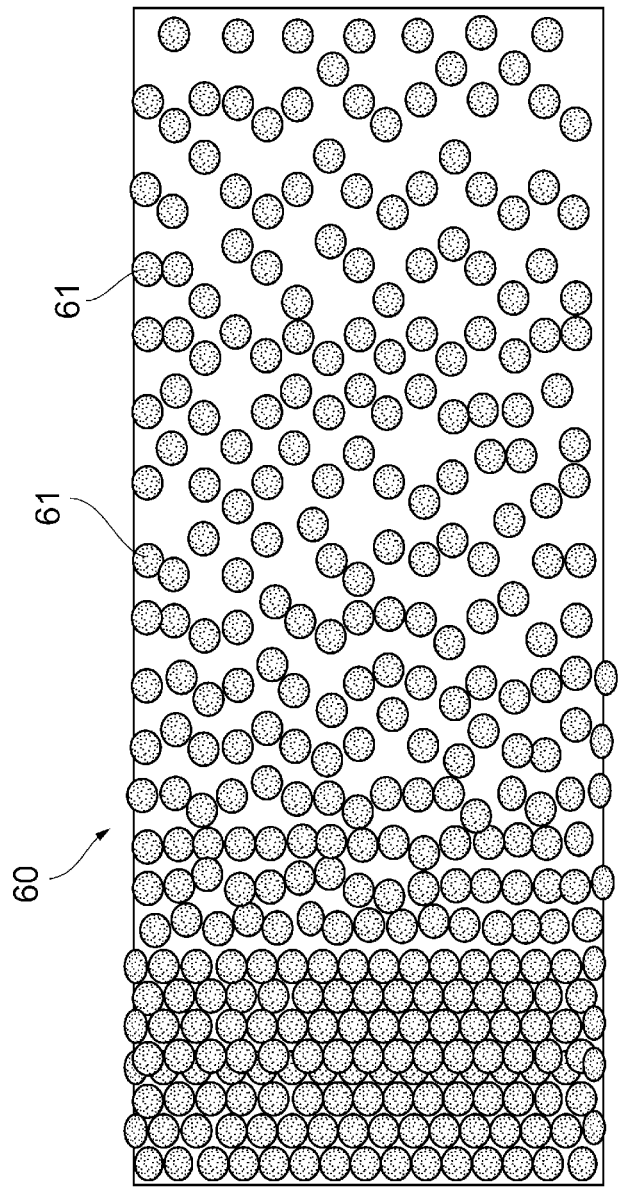
FIG. 8 shows a plan view of an illuminating device in accordance with an embodiment of the present disclosure.

In one non-limiting aspect of the present disclosure, as shown in FIGS. 7 and 8, the diffuse reflection layer 60 may have a plurality of dots 61 which increase in density as the distance from the light source 40 increases. According to the Beer-Lambert law, as the light 41 propagates from the light source 40 farther away, the more the intensity of the light 41 attenuates and also the intensity of the light 21R, 22G, and 23B decreases. For example, an intensity 72 of the light 21R, 22G, and 23B at the midpoint of the transparent member 30 is larger than an intensity 73 of the light 21R, 22G, and 23B near the opposite side edge 32 but smaller than an intensity 71 of the light 21R, 22G, and 23B near the side edge 31. Due to the plurality of dots 61 increasing in density as the distance from the light source 40 increases, an intensity of diffusely reflected light from the plurality of dots 61 increases as the distance from the light source 40 increases. For example, an intensity 82 of the diffusely reflected light from the dots 61 at the midpoint of the transparent member 30 is larger than an intensity 81 of the diffusely reflected light from the dots 61 near the side edge 31 but smaller than an intensity 83 of the diffusely reflected light from the dots 61 near the opposite side edge 32. In this way, a luminance distribution at the light emission surface 34 can be made substantially uniform.

In one non-limiting aspect of the present disclosure, a transparent fluorescent substance for white light emission can be manufactured by combining the red, green, and blue fluorescent transparent substances 21, 22, and 23 to form a mixture of the red, green, and blue fluorescent transparent substances 21, 22, and 23 that emit white light in response to the light 41 applied thereto. A monomer may be added to the mixture of the red, green, and blue fluorescent transparent substances 21, 22, and 23 and then may be polymerized to produce the transparent member 30 that emits the white light in response to the light 41.

EXAMPLES

Example 1

Preparation of Red Fluorescent Transparent Substance

Tri-n-butyl phosphate complex, serving as the europium complex used for the red fluorescent transparent substance 21, was prepared according to the following procedure. Europium ions were extracted in hexane by adding n-tributyl phosphate and hexane to an aqueous solution of a water-soluble europium salt, such as europium nitrate, followed by vigorous shaking Because tri-n-butyl phosphate includes n-butyl serving as a lipophilic group and phosphoric acid serving as a water-soluble group to be coordinated to the europium ions, the europium complex formed as a result of the phosphoric acid being coordinated to the europium ions in the water solution was extracted in the hexane in the organic phase. In a glass container, 12 grams of concentrated nitric acid (with a concentration of 60 wt % by weight and a specific gravity of 1.38) was added to 6 grams of europium oxide to prepare a europium nitrate solution. When mixed with concentrated nitric acid, europium oxide dissolved by the heat of the ensuing reaction and produced colorless, transparent, highly concentrated europium nitrate. Tri-n-butyl phosphate (27 grams) and hexane (30 grams) were added to this europium nitrate solution, which was then shaken vigorously for one minute to extract the europium ions from the water phase into the organic phase. After the water phase was removed, the hexane was evaporated with an evaporator to produce the red fluorescent transparent substance 21 in which the phosphate group was coordinated to the europium ions.

Example 2

Preparation of Green Fluorescent Transparent Substance

Tri-n-butyl phosphate complex, serving as the terbium complex used for the green fluorescent transparent substance, was prepared according to the following procedure. As with the europium complex, terbium ions were extracted in hexane by adding n-tributyl phosphate and hexane to an aqueous solution of a water-soluble terbium salt, such as terbium nitrate, followed by vigorous shaking. In a glass container, 12 grams of concentrated nitric acid (with a concentration of 60% by weight and a specific gravity of 1.38) was added to 6 grams of terbium oxide to prepare a terbium nitrate solution. The mere addition of concentrated nitric acid did not cause the terbium oxide to react; therefore, the terbium nitrate solution was stirred while being heated on a hot plate at a temperature of about 150 degrees Celsius to dissolve into the concentrated nitric acid, thus producing colorless, transparent, highly concentrated terbium nitrate. Tri-n-butyl phosphate (26 grams) and hexane (30 grams) were added to this terbium nitrate solution, which was then shaken vigorously for one minute to extract the terbium ions from the water phase into the organic phase. After the water phase was removed, the hexane was evaporated with an evaporator to produce the green fluorescent transparent substance 22 in which the phosphate group was coordinated to the terbium ions.

Example 3

Preparation of Blue Fluorescent Transparent Substance

For the blue luminous organic dye, 0.1 grams of commercially available 9,10-dibromoanthracene was dissolved in 29.4 grams of tri-n-butyl phosphate to prepare a $10^{-2}$ M solution. Then, 0.3 grams of this solution was dissolved in 29.1 grams of tri-n-butyl phosphate to prepare a $10^{-4}$ M solution of the blue fluorescent transparent substance 23.

Example 4

Preparation of White Fluorescent Transparent Substance

Figure 9:
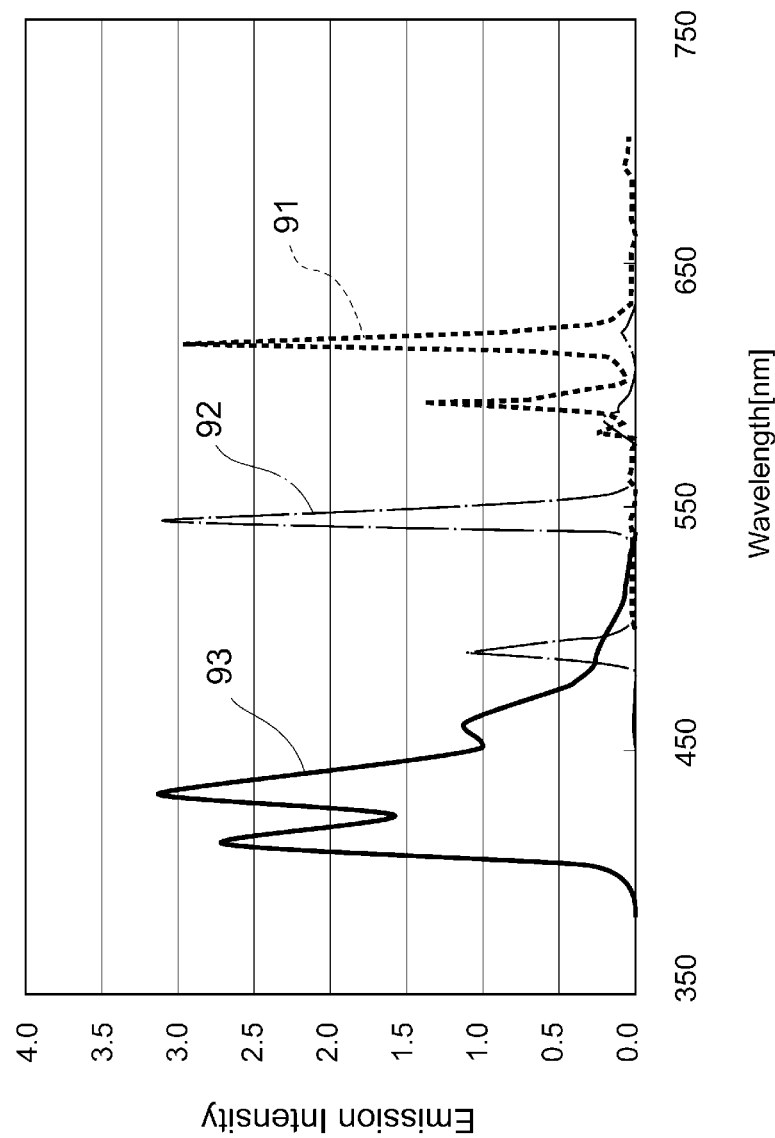
FIG. 9 shows emission spectra of red, green, and blue fluorescent transparent substances at an excitation wavelength of 375 nanometers in accordance with an embodiment of the present disclosure.

A white fluorescent transparent substance was produced by mixing the red, green, and blue fluorescent transparent substances 21, 22, and 23 prepared through Examples 1-3. To obtain the mixing ratio that produces white emission, the excitation and luminescence characteristics of the red, green, and blue fluorescent transparent substances 21, 22, and 23 were measured. Assuming that a 375 nanometer UV-LED is used as a light source, the emission spectra were measured with 375 nanometer excitation light. FIG. 9 shows emission spectra of the red, green, and blue fluorescent transparent substances 21, 22, and 23 at an excitation wavelength of 375 nanometers. In FIG. 9, reference numbers 91, 92, and 93 denote emission spectra of the red, green, and blue fluorescent transparent substances 21, 22, and 23, respectively. Based on FIG. 9, the mixing ratio of red, green, and blue fluorescent transparent substances 21, 22, and 23 that produces white emission was calculated.

$x = \int P_R(w)x(w)dw$ ($w$=from about 380 to about 780 nanometers) [Math. 1]

$y = \int P_G(w)y(w)dw$ ($w$=from about 380 to about 780 nanometers) [Math. 2]

$z = \int P_B(w)z(w)dw$ ($w$=from about 380 to about 780 nanometers) [Math. 3]

Here, $P_R(w)$ denotes the emission intensity at each wavelength of the red fluorescent transparent substance 21; $P_G(w)$ denotes the emission intensity at each wavelength of the green fluorescent transparent substance 22; $P_B(w)$ denotes the emission intensity at each wavelength of the blue fluorescent transparent substance 23; and $x(w)$, $y(w)$, and $z(w)$ are color matching functions at a CIE 2-degree field of view. An x value and a y value on a CIE chromaticity diagram can be obtained from the following expressions.

$x = X/(X+Y+Z)$ $y = Y/(X+Y+Z)$

Table 2 shows calculation results of the x value and the y value, where R, G, and B denote the weight percent ratio of the red, green, and blue fluorescent transparent substances 21, 22, and 23, respectively.

TABLE 2

|   | R | G | B | Y | X | y |
|---|---|---|---|---|---|---|
| 1 | 40 wt % | 50 wt % | 10 wt % | 12.779 | 0.2885 | 0.3346 |
| 2 | 41 wt % | 50 wt % | 9 wt % | 12.779 | 0.3050 | 0.3451 |
| 3 | 42 wt % | 50 wt % | 8 wt % | 12.779 | 0.3226 | 0.3563 |
| 4 | 43 wt % | 50 wt % | 7 wt % | 12.779 | 0.3413 | 0.3683 |
| 5 | 44 wt % | 50 wt % | 6 wt % | 12.779 | 0.3614 | 0.3811 |
| 6 | 45 wt % | 50 wt % | 5 wt % | 12.779 | 0.3829 | 0.3948 |

Figure 10:
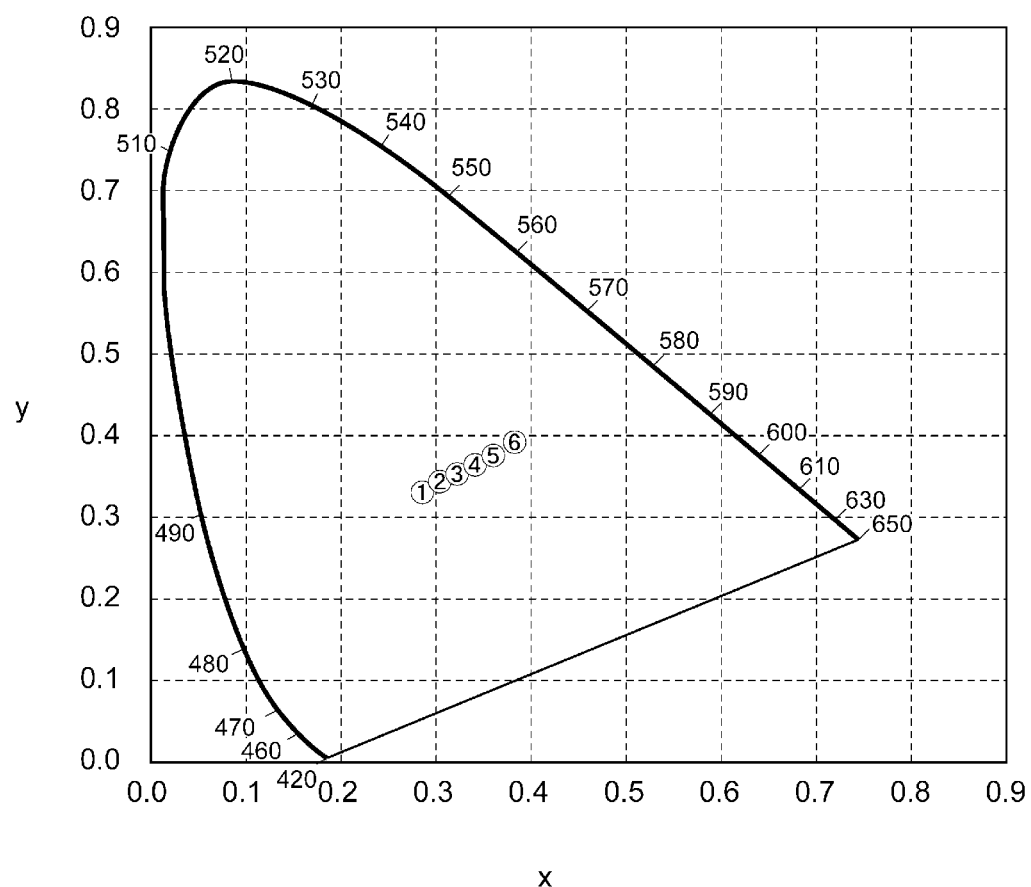
FIG. 10 shows an x value and a y value on a CIE chromaticity diagram in accordance with an embodiment of the present disclosure.

FIG. 10 shows the x value and the y value on the CIE chromaticity diagram. To examine the difference between the luminescence based on the calculated mixing ratio among the red, green, and blue fluorescent transparent substances 21, 22, and 23 and the luminescence of an actual mixture, a mixture containing 4 grams of the red fluorescent transparent substance 21, 5 grams of the green fluorescent transparent substance 22, and 1 gram of the blue fluorescent transparent substance 23 was excited with 375 nanometer ultraviolet light, and the emission spectrum was measured.

Figure 11:
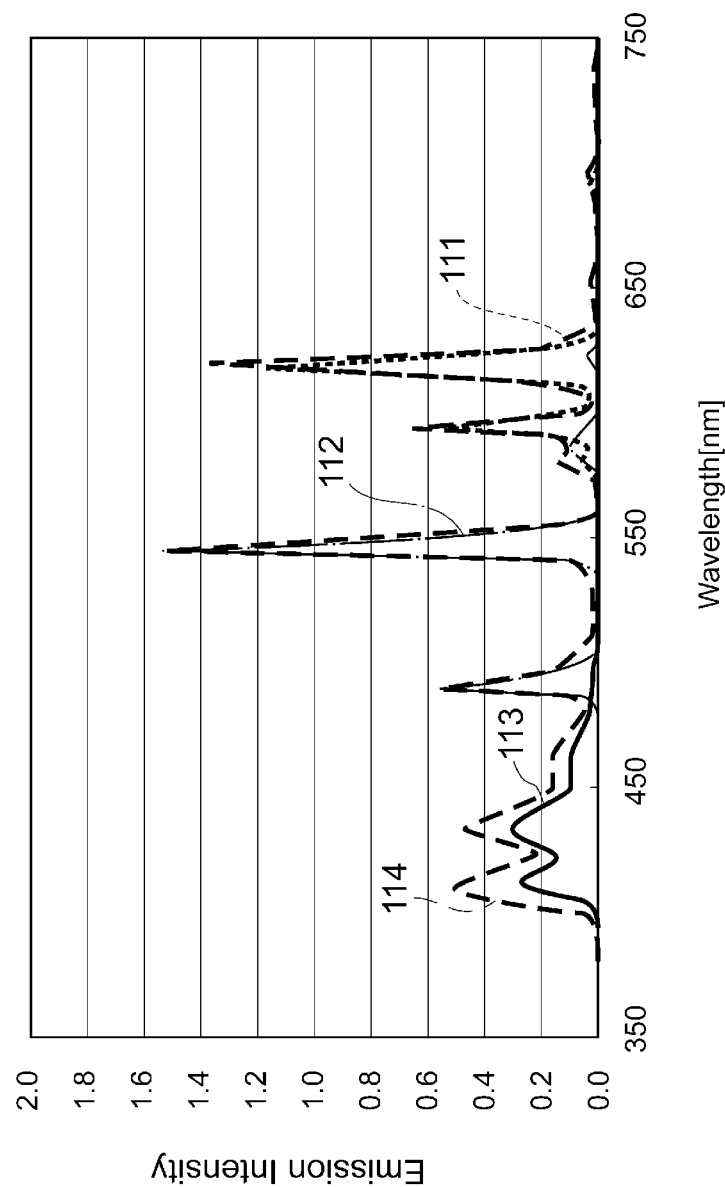
FIG. 11 shows a comparison of emission spectra between calculated values and an actual mixture in accordance with an embodiment of the present disclosure.

FIG. 11 shows a comparison of emission spectra between calculated values and an actual mixture. In FIG. 11, reference numbers 111, 112, and 113 respectively denote the emission spectra of the red, green, and blue fluorescent transparent substances 21, 22, and 23 calculated based on the mixing ratio, and reference number 114 denotes the emission spectrum of the actual mixture. As shown in FIG. 11, the actual mixture exhibited more intense blue and red components than the calculated values, resulting in a purplish tone. By correcting this, a solution of the white fluorescent transparent substance was produced with a mixing ratio of 3.7 grams of the red fluorescent transparent substance 21, 5.4 grams of the green fluorescent transparent substance 22, and 0.9 grams of the blue fluorescent transparent substance 23.

Example 5

Preparation of Light Guide Structure

Figure 13:
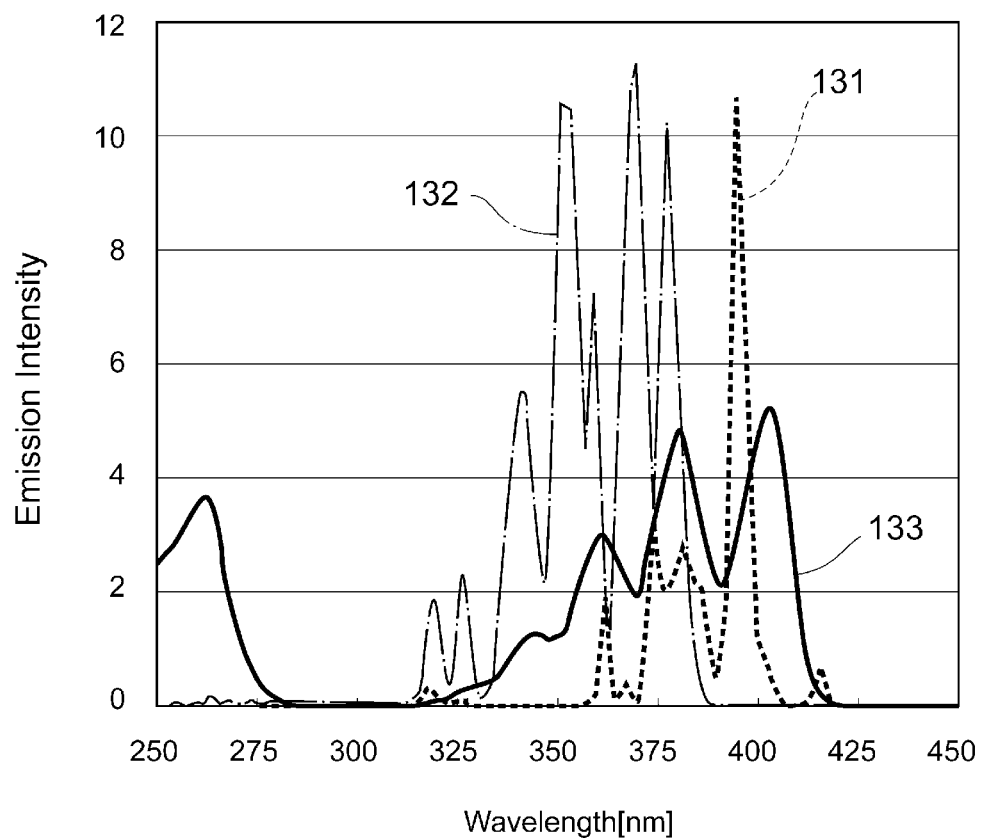
FIG. 13 shows excitation spectra of red, green, and blue fluorescent transparent substances in accordance with an embodiment of the present disclosure.
Figure 14:
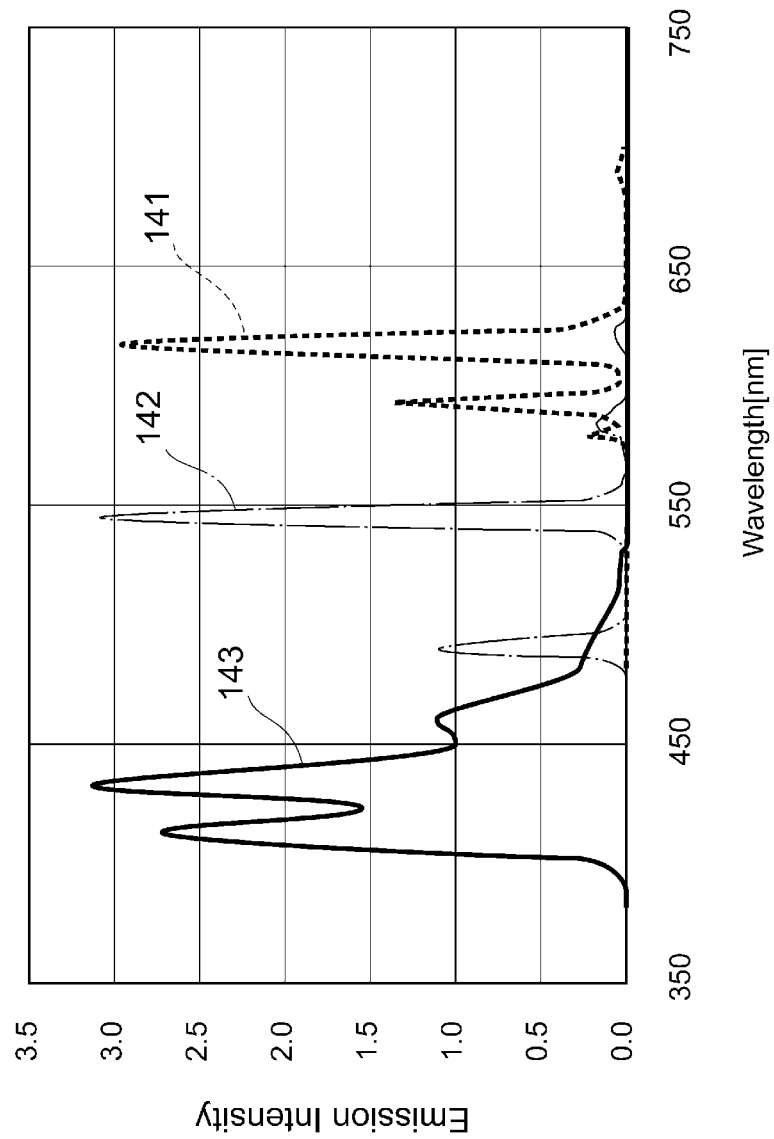
FIG. 14 shows emission spectra of red, green, and blue fluorescent transparent substances at an excitation wavelength of 375 nanometers in accordance with an embodiment of the present disclosure.
Figure 15:
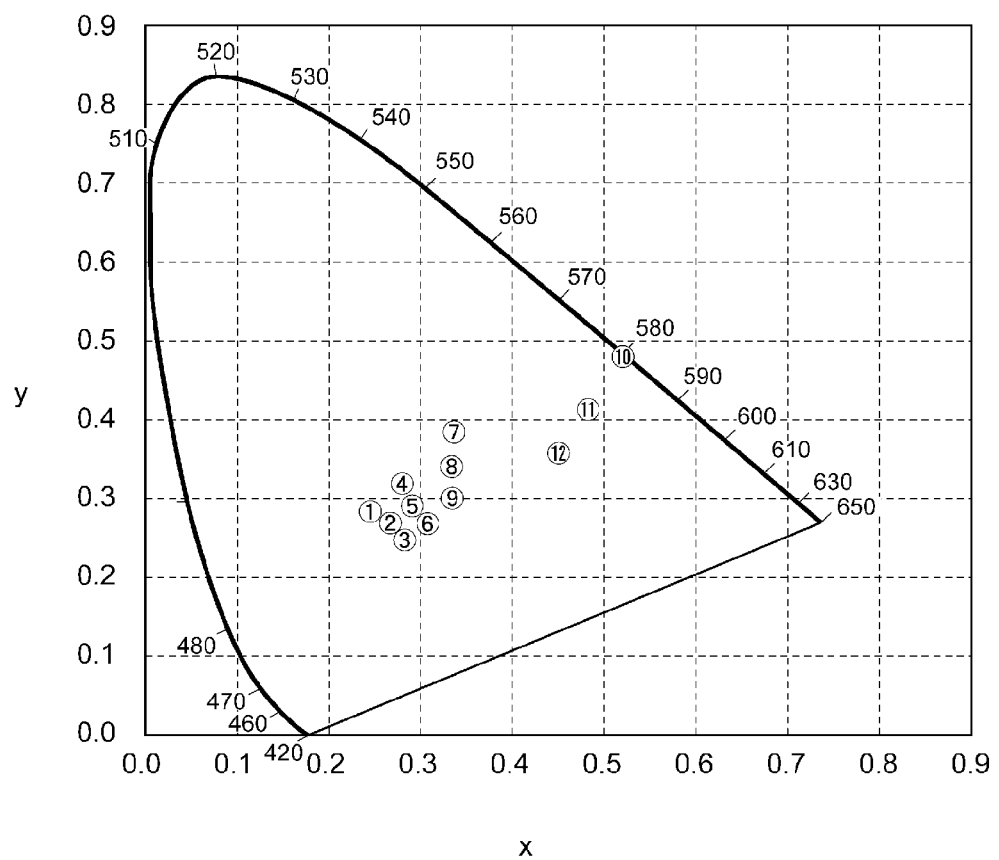
FIG. 15 shows an x value and a y value on a CIE chromaticity diagram in accordance with an embodiment of the present disclosure.

As a hardening agent, 0.14 grams of benzoyl peroxide was added to 70 grams of methyl methacrylate monomer (MMA), and these were mixed with 10 grams of the white fluorescent transparent substance prepared through Example 4. When mixed, the white fluorescent transparent substance remained transparent and did not cause any phase separation or white turbidity in the MMA. The white fluorescent transparent substance was poured into a closed container and heated at a temperature of from about 80 to about 90 degrees Celsius to decompose the benzoyl peroxide, and methylmethacrylate was polymerized by radical polymerization to prepare polymethyl methacrylate (PMMA) containing the white fluorescent transparent substance. The temperature increased during polymerization due to the heat generated by the radical reaction. The boiling point of the MMA is about 101 degrees Celsius and, above this temperature, boiling occurred and bubbles were generated. It was, therefore, desirable to keep the temperature at from about 80 to about 90 degrees Celsius after the MMA polymerization started and the liquid became viscous. In this manner, the light guide structure 10 configured to be excited by ultraviolet light whose excitation wavelength was selected as 375 nanometers was prepared.

through Examples 1-3. As a wavelength to excite all of the red, green, and blue fluorescent transparent substances 21, 22, and 23 simultaneously, an excitation wavelength of 375 nanometers was selected. In FIG. 13, reference numbers 131, 132, and 133 denote the excitation spectra of the red, green, and blue fluorescent transparent substances 21, 22, and 23, respectively. FIG. 14 shows emission spectra of the red, green, and blue fluorescent transparent substances 21, 22, and 23 prepared through Examples 1-3 at an excitation wavelength of 375 nanometers. In FIG. 14, reference numbers 141, 142, and 143 denote the emission spectra of the red, green, and blue fluorescent transparent substances 21, 22, and 23, respectively. Table 3 shows calculation results of the x value and the y value at the excitation wavelength of 375 nanometers, where T denotes the color temperature. FIG. 15 shows the x value and the y value on the CIE chromaticity diagram at the excitation wavelength of 375 nanometers.

TABLE 4

|    | T        | R         | G         | B         | Y      | x      | y      |
|----|----------|-----------|-----------|-----------|--------|--------|--------|
| 1  | 15000 K+ | 38.11 wt %| 47.19 wt %| 14.10 wt %| 12.214 | 0.2441 | 0.2840 |
| 2  | 15000 K  | 41.37 wt %| 44.58 wt %| 14.05 wt %| 11.394 | 0.2649 | 0.2649 |
| 3  | 15000 K− | 43.66 wt %| 41.97 wt %| 14.37 wt %| 10.727 | 0.2769 | 0.2470 |
| 4  | 8500 K+  | 39.53 wt %| 49.76 wt %| 10.71 wt %| 12.718 | 0.2790 | 0.3259 |
| 5  | 8500 K   | 42.04 wt %| 46.54 wt %| 11.42 wt %| 11.895 | 0.2901 | 0.2980 |
| 6  | 8500 K−  | 44.39 wt %| 43.52 wt %| 12.09 wt %| 11.123 | 0.3000 | 0.2730 |
| 7  | 5500 K+  | 41.53 wt %| 51.65 wt %| 6.82 wt % | 13.201 | 0.3320 | 0.3831 |
| 8  | 5500 K   | 43.62 wt %| 48.13 wt %| 8.25 wt % | 12.301 | 0.3320 | 0.3399 |
| 9  | 5500 K−  | 45.48 wt %| 45.01 wt %| 9.51 wt % | 11.504 | 0.3321 | 0.3050 |
| 10 | 2500 K+  | 49.78 wt %| 50.22 wt %| 0.00 wt % | 12.836 | 0.5165 | 0.4835 |
| 11 | 2500 K   | 50.54 wt %| 47.14 wt %| 2.32 wt % | 12.048 | 0.4750 | 0.4111 |
| 12 | 2500 K−  | 51.16 wt %| 44.42 wt %| 4.42 wt % | 11.353 | 0.4430 | 0.3569 |

Example 6

Adjusting Mixing Ratio Among Fluorescent Substances

Figure 12:
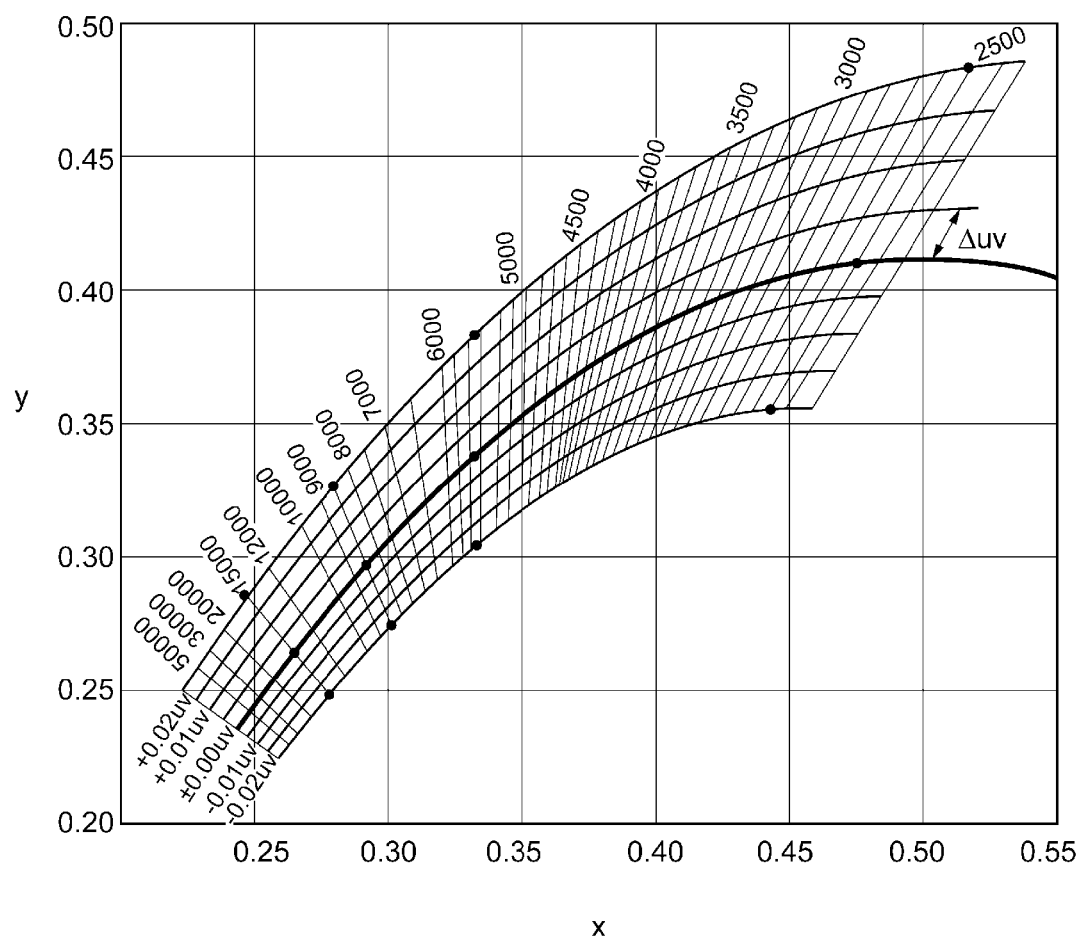
FIG. 12 shows a black body radiation curve used for defining white color in accordance with an embodiment of the present disclosure.

A shown in FIG. 12, white color may be defined as having color temperatures ranging from about 2500 kelvin to about 15000 kelvin within a black body radiation curve. In a more specific sense, the white color may be defined as having color temperatures ranging from about 5500 kelvin to about 8500 kelvin. This color temperature range would be expected to have a 50% probability of being recognized as white color. As shown in Table 3, a color deviation of white color may be defined within plus or minus 0.002 uv.

TABLE 3

| Color Temperature | Color Deviation | CIE Color Point |
|-------------------|-----------------|-----------------|
| 15000 kelvin      | +0.02uv         | (0.244, 0.284)  |
|                   | 0               | (0.265, 0.265)  |
|                   | −0.02uv         | (0.277, 0.247)  |
| 8500 kelvin       | +0.02uv         | (0.279, 0.326)  |
|                   | 0               | (0.290, 0.298)  |
|                   | −0.02uv         | (0.300, 0.273)  |
| 5500 kelvin       | +0.02uv         | (0.332, 0.383)  |
|                   | 0               | (0.332, 0.340)  |
|                   | −0.02uv         | (0.332, 0.305)  |
| 2500 kelvin       | +0.02uv         | (0.520, 0.484)  |
|                   | 0               | (0.475, 0.412)  |
|                   | −0.02uv         | (0.443, 0.357)  |

FIG. 13 shows excitation spectra of the red, green, and blue fluorescent transparent substances 21, 22, and 23 prepared According to Table 4, in order for the light guide structure 10 to produce the white light under the condition that all of the red, green, and blue fluorescent transparent substances 21, 22, and 23 prepared through Examples 1-3 were excited by the excitation wavelength of 375 nanometers, a ratio of the red fluorescent transparent substance 21 to a combination of the red, green, and blue fluorescent transparent substances 21, 22, and 23 may be from about 38% to about 52% by weight. Likewise, a ratio of the green fluorescent transparent substance 22 to the combination of the red, green, and blue fluorescent transparent substances 21, 22, and 23 may be from about 41% to about 52% by weight. Likewise, a ratio of the blue fluorescent transparent substance 23 to the combination of the red, green, and blue fluorescent transparent substances 21, 22, and 23 may be from about 0% to about 15% by weight.

Figure 16:
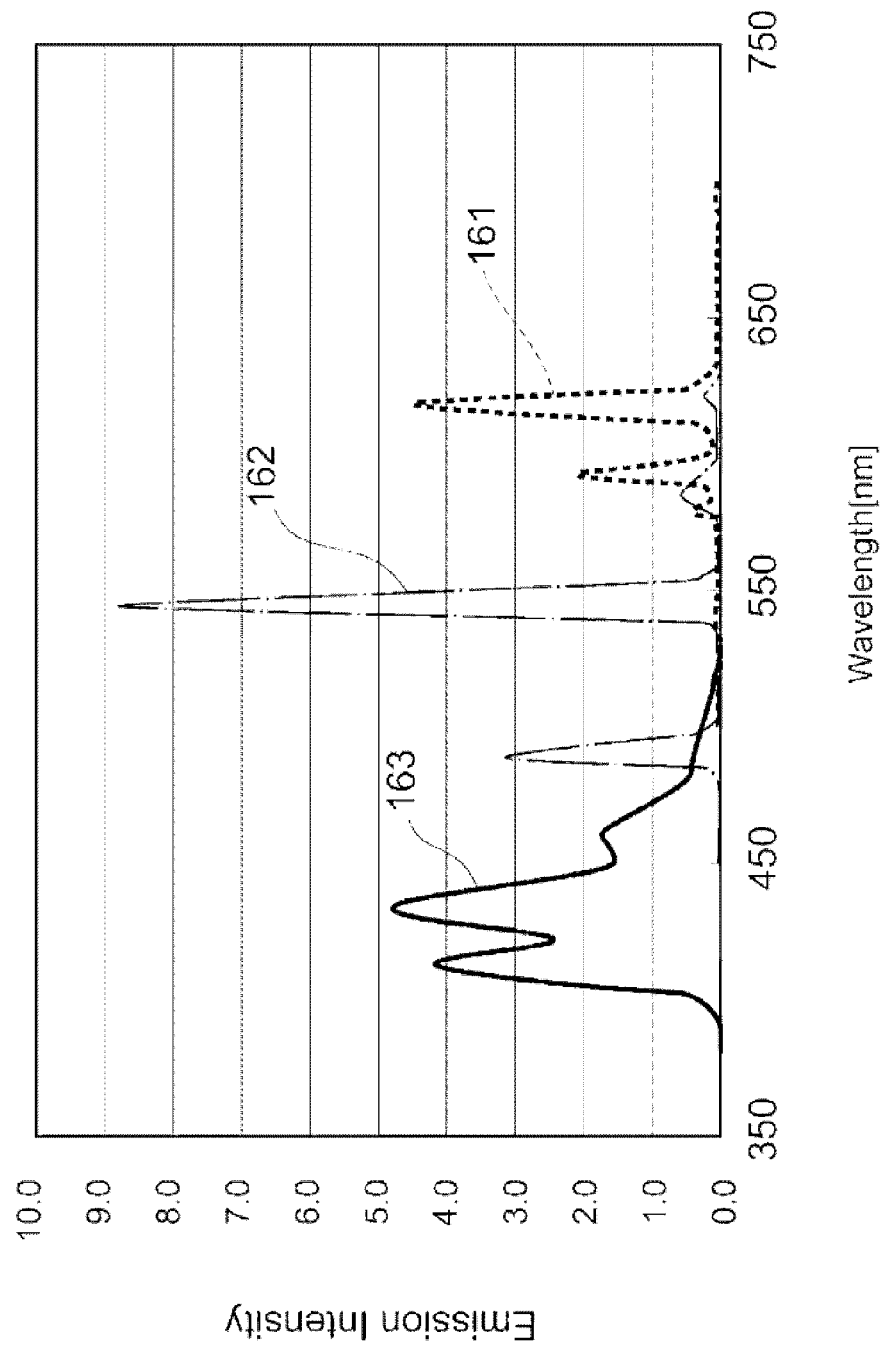
FIG. 16 shows emission spectra of red, green, and blue fluorescent transparent substances at an excitation wavelength of 380 nanometers in accordance with an embodiment of the present disclosure.
Figure 17:
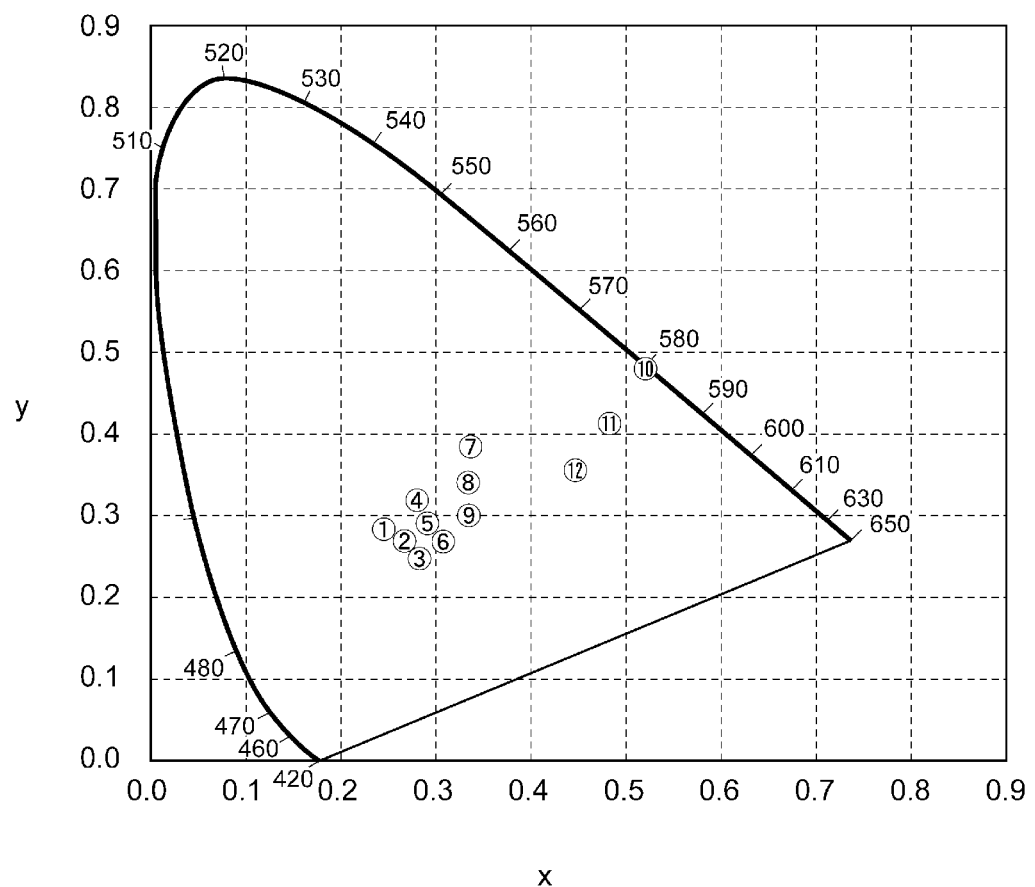
FIG. 17 shows an x value and a y value on a CIE chromaticity diagram in accordance with an embodiment of the present disclosure.

Next, as a wavelength to excite all of the red, green, and blue fluorescent transparent substances 21, 22, and 23 simultaneously, an excitation wavelength of 380 nanometers was selected. As shown in FIG. 13, the red, green, and blue fluorescent transparent substances 21, 22, and 23 were capable of being excited not only by the excitation wavelength of 375 nanometers but also by the excitation wavelength of 380 nanometers. FIG. 16 shows emission spectra of the red, green, and blue fluorescent transparent substances 21, 22, and 23 prepared through Examples 1-3 at an excitation wavelength of 380 nanometers. In FIG. 16, reference numbers 161, 162, and 163 denote the emission spectra of the red, green, and blue fluorescent transparent substances 21, 22, and 23, respectively. Table 4 shows calculation results for the x value and the y value at the excitation wavelength of 380 nanometers. FIG. 17 shows the x value and the y value on the CIE chromaticity diagram at the excitation wavelength of 380 nanometers.

TABLE 5

| T | R | G | B | Y | x | y |
|---|---|---|---|---|---|---|
| 1 | 15000 K+ | 48.83 wt % | 33.08 wt % | 18.09 wt % | 24.059 | 0.2439 | 0.2840 |
| 2 | 15000 K | 52.06 wt % | 30.28 wt % | 17.66 wt % | 22.023 | 0.2651 | 0.2650 |
| 3 | 15000 K− | 54.14 wt % | 28.07 wt % | 17.79 wt % | 20.415 | 0.2771 | 0.2470 |
| 4 | 8500 K+ | 51.28 wt % | 34.84 wt % | 13.88 wt % | 25.339 | 0.2791 | 0.3260 |
| 5 | 8500 K | 53.48 wt % | 31.98 wt % | 14.54 wt % | 23.259 | 0.2900 | 0.2981 |
| 6 | 8500 K− | 55.51 wt % | 29.37 wt % | 15.12 wt % | 21.361 | 0.3000 | 0.2729 |
| 7 | 5500 K+ | 54.48 wt % | 36.57 wt % | 8.95 wt % | 26.597 | 0.3320 | 0.3830 |
| 8 | 5500 K | 56.03 wt % | 33.38 wt % | 10.59 wt % | 24.227 | 0.3320 | 0.3400 |
| 9 | 5500 K− | 57.35 wt % | 30.65 wt % | 12.00 wt % | 22.292 | 0.3320 | 0.3050 |
| 10 | 2500 K+ | 64.96 wt % | 35.04 wt % | 0.00 wt % | 25.485 | 0.5189 | 0.4811 |
| 11 | 2500 K | 64.51 wt % | 32.55 wt % | 2.94 wt % | 23.674 | 0.4749 | 0.4119 |
| 12 | 2500 K− | 64.29 wt % | 30.15 wt % | 5.56 wt % | 21.928 | 0.4429 | 0.3570 |

According to Table 5, in order for the light guide structure 10 to produce the white light under the condition that all of the red, green, and blue fluorescent transparent substances 21, 22, and 23 prepared through Examples 1-3 were excited by the excitation wavelength of 380 nanometers, the ratio of the red fluorescent transparent substance 21 to the combination of the red, green, and blue fluorescent transparent substances 21, 22, and 23 may be from about 48% to about 65% by weight. Likewise, the ratio of the green fluorescent transparent substance 22 to the combination of the red, green, and blue fluorescent transparent substances 21, 22, and 23 may be from about 28% to about 37% by weight. Likewise, the ratio of the blue fluorescent transparent substance 23 to the combination of the red, green, and blue fluorescent transparent substances 21, 22, and 23 may be from about 0% to about 19% by weight.

Figure 18:
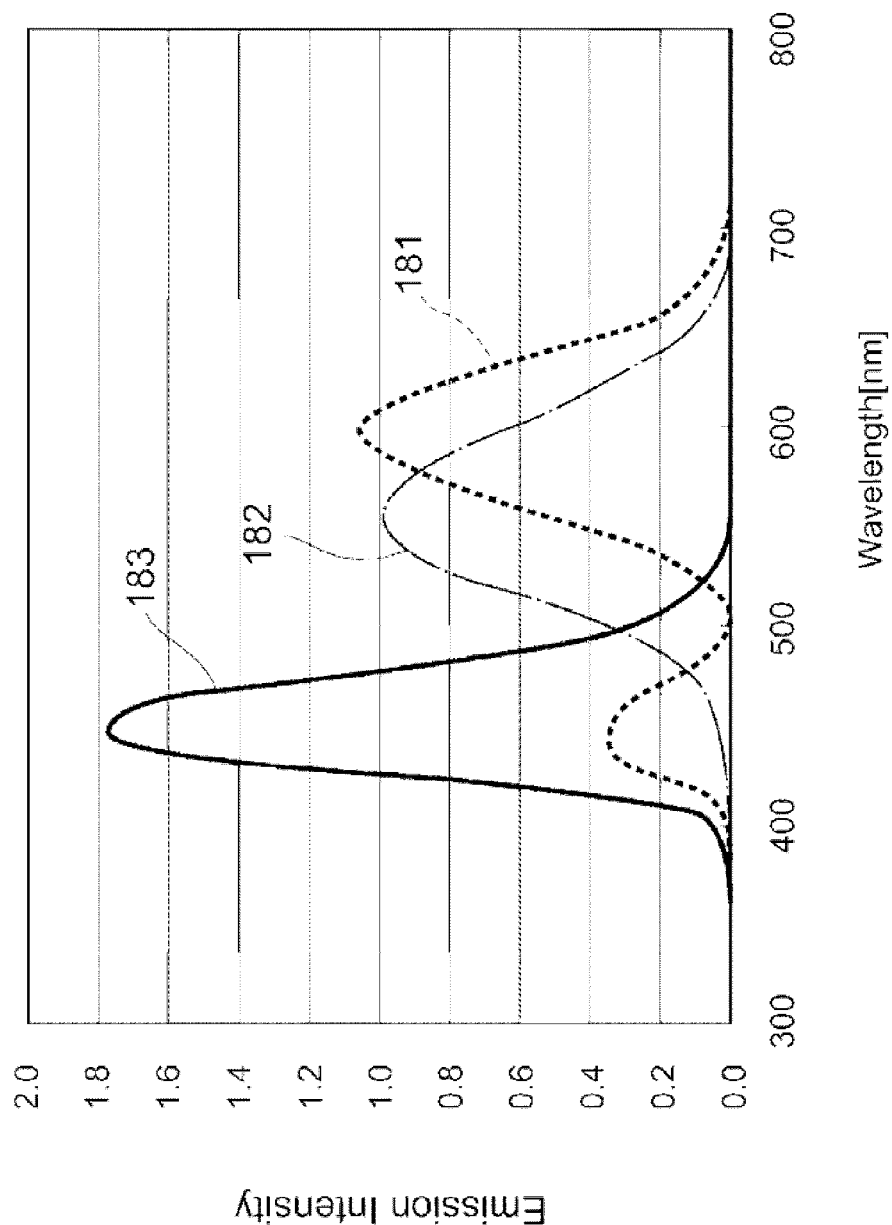
FIG. 18 shows emission spectra of red, green, and blue color matching functions in accordance with an embodiment of the present disclosure.

Next, under the condition that an emission intensity of each of the red, green, and blue lights was substantially uniform, excitation wavelengths of the red, green, and blue fluorescent transparent substances 21, 22, and 23 were calculated according to the following procedure. FIG. 18 shows emission spectra of red, green, and blue color matching functions. In FIG. 18, reference numbers 181, 182, and 183 denote the emission spectra of the red, green, and blue color matching functions, respectively. As can be seen from FIG. 18, the highest stimulus value obtained by the blue color matching function 183 was at about 440 nanometers. Likewise, the highest stimulus value obtained by the green color matching function 182 was at about 555 nanometers. Also, the highest stimulus value obtained by the red color matching function 181 was at about 600 nanometers.

Figure 19:
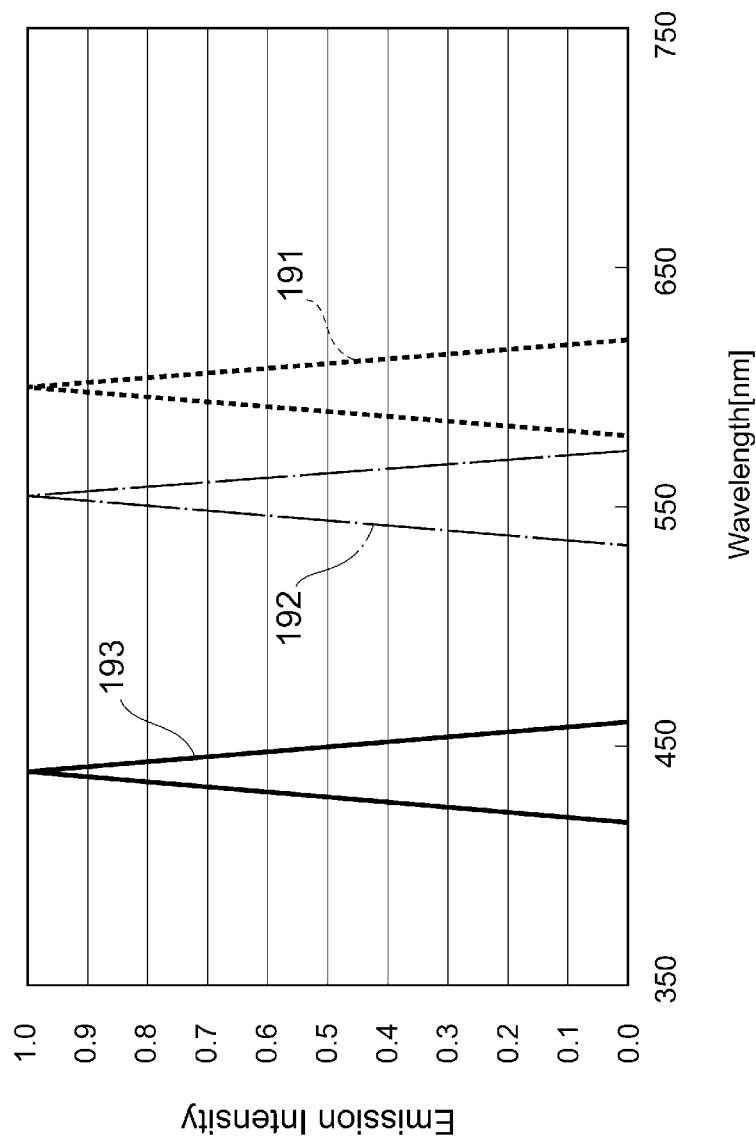
FIG. 19 shows emission spectra of red, green, and blue fluorescent transparent substances in accordance with an embodiment of the present disclosure.
Figure 20:
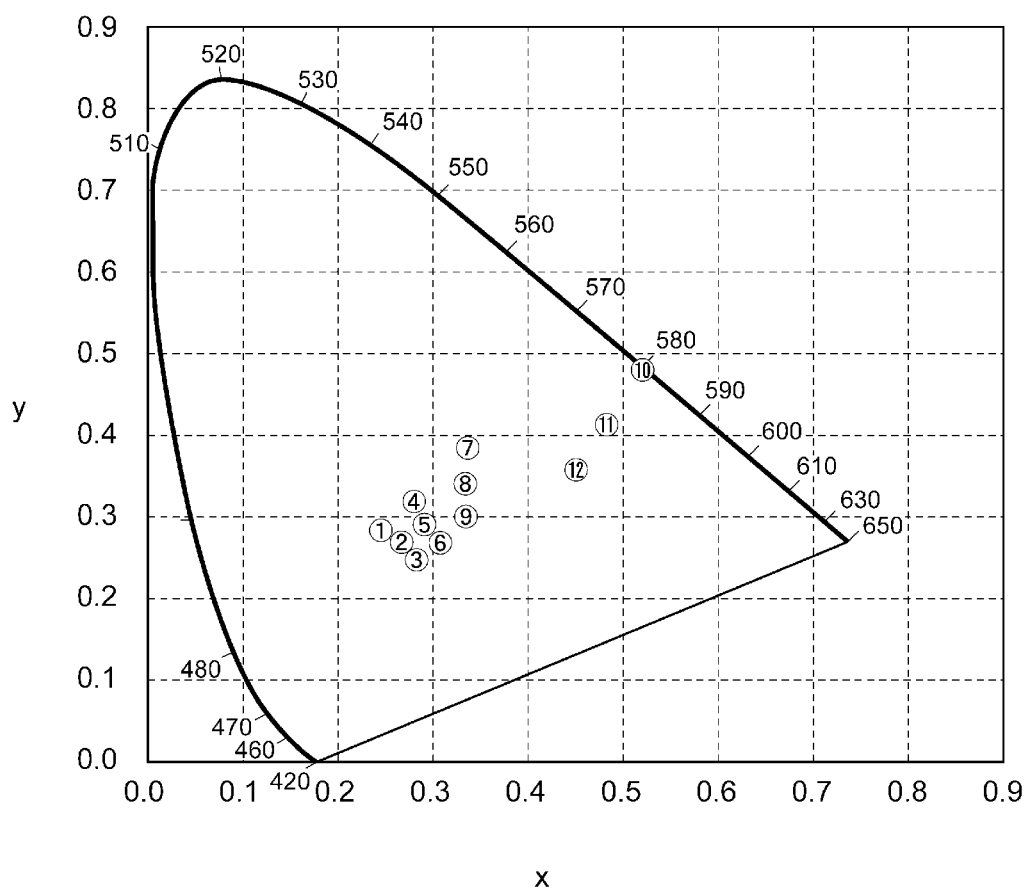
FIG. 20 shows an x value and a y value on a CIE chromaticity diagram in accordance with an embodiment of the present disclosure.

To examine a mixing ratio among the red, green, and blue fluorescent transparent substances 21, 22, and 23 so that white light was produced, as shown in FIG. 19, three triangular spectra, each having the same emission intensity of 1.0 at the wavelengths of 440 nanometers, 555 nanometers, and 600 nanometers, respectively, with a half width of 20 nanometers, were assumed. In FIG. 19, reference numbers 191, 192, and 193 denote the assumed emission spectra of the red, green, and blue fluorescent transparent substances 21, 22, and 23. Table 5 shows calculation results for the x value and the y value under the use of the assumed emission spectra 191, 192, and 193. FIG. 20 shows the x value and the y value on the CIE chromaticity diagram under the use of the assumed emission spectra 191, 192, and 193.

TABLE 6

| T | R | G | B | Y | x | y |
|---|---|---|---|---|---|---|
| 1 | 15000 K+ | 29.12 wt % | 35.43 wt % | 35.45 wt % | 6.989 | 0.2441 | 0.2840 |
| 2 | 15000 K | 31.62 wt % | 33.06 wt % | 35.32 wt % | 6.521 | 0.2650 | 0.2649 |
| 3 | 15000 K− | 33.17 wt % | 30.93 wt % | 35.90 wt % | 6.101 | 0.2770 | 0.2470 |
| 4 | 8500 K+ | 32.12 wt % | 39.25 wt % | 28.63 wt % | 7.742 | 0.2790 | 0.3260 |
| 5 | 8500 K | 33.68 wt % | 36.19 wt % | 30.13 wt % | 7.138 | 0.2900 | 0.2980 |
| 6 | 8500 K− | 35.11 wt % | 33.42 wt % | 31.47 wt % | 6.592 | 0.3000 | 0.2730 |
| 7 | 5500 K+ | 36.40 wt % | 43.92 wt % | 19.68 wt % | 8.663 | 0.3320 | 0.3830 |
| 8 | 5500 K | 37.13 wt % | 39.77 wt % | 23.10 wt % | 7.845 | 0.3320 | 0.3400 |
| 9 | 5500 K− | 37.75 wt % | 36.26 wt % | 25.99 wt % | 7.152 | 0.3320 | 0.3050 |
| 10 | 2500 K+ | 50.72 wt % | 49.28 wt % | 0.00 wt % | 9.720 | 0.5184 | 0.4816 |
| 11 | 2500 K | 48.62 wt % | 44.10 wt % | 7.28 wt % | 8.699 | 0.4750 | 0.4120 |
| 12 | 2500 K− | 47.13 wt % | 39.60 wt % | 13.27 wt % | 7.811 | 0.4443 | 0.3570 |

According to Table 6, in order for the light guide structure 10 to produce the white light under the condition that all of the red, green, and blue fluorescent transparent substances 21, 22, and 23 prepared through Examples 1-3 were excited by the assumed emission spectra 191, 192, and 193, the ratio of the red fluorescent transparent substance 21 to the combination of the red, green, and blue fluorescent transparent substances 21, 22, and 23 may be from about 29% to about 51% by weight. Likewise, the ratio of the green fluorescent transparent substance 22 to the combination of the red, green, and blue fluorescent transparent substances 21, 22, and 23 may be from about 30% to about 44% by weight. Likewise, the ratio of the blue fluorescent transparent substance 23 to the combination of the red, green, and blue fluorescent transparent substances 21, 22, and 23 may be from about 0% to about 36% by weight.

In view of the content of Tables 4-6, in order for the light guide structure 10 to produce the white light, the ratio of the red fluorescent transparent substance 21 to the combination of the red, green, and blue fluorescent transparent substances 21, 22, and 23 may be from about 25% to about 65% by weight. Likewise, the ratio of the green fluorescent transparent substance 22 to the combination of the red, green, and blue fluorescent transparent substances 21, 22, and 23 may be from about 20% to about 60% by weight. Moreover, the ratio of the blue fluorescent transparent substance 23 to the combination of the red, green, and blue fluorescent transparent substances 21, 22, and 23 may be from about 0% to about 40% by weight.

Example 7

Preparation of Diffuse Reflection Layer

Forty parts by weight of titanium oxide (rutile) with a particle size of 300 nm, 20 parts by weight of acrylic binder, and 40 parts by weight of terpineol serving as a solvent were mixed with a three-roll machine to produce a paste. The back surface 33 of the transparent member 30 was coated with this paste by screen printing to form the diffuse reflection layer 60. When measuring the light reflection at the diffuse reflection layer 60 by using a reflectometer having an integrating sphere, the reflectance was nearly 100%.

Example 8

Resin Casting

The transparent member 30 may be prepared through a resin casting process, for example, by adding a methyl methacrylate monomer to a mixture of the red, green, and blue fluorescent transparent substances 21, 22, and 23 and then polymerizing the methyl methacrylate monomer so as to produce the transparent member 30. When polymerizing the methyl methacrylate monomer, a polymer solidification process may be carried out, with the methyl methacrylate monomer being sandwiched between two glass plates, so as to produce the transparent member 30.

Example 9

Continuous Casting

The transparent member 30 may be prepared through a continuous casting process, for example, by adding a methyl methacrylate monomer to a mixture of the red, green, and blue fluorescent transparent substances 21, 22, and 23 and then polymerizing the methyl methacrylate monomer so as to produce the transparent member 30. When polymerizing the methyl methacrylate monomer, a polymer solidification process may be carried out, with the methyl methacrylate monomer being sandwiched between two belts, arranged one above the other, while rotating the two belts slowly so as to produce the transparent member 30. Each of the two belts may be made of polished stainless steel.

Example 10

Solution Casting

The transparent member 30 may be prepared through a solution casting process, for example, by adding a poly methyl methacrylate solution to a mixture of the red, green, and blue fluorescent transparent substances 21, 22, and 23 and then evaporating a solvent from the poly methyl methacrylate solution so as to produce the transparent member 30. For example, chloroform, tetrachloroethane, dichloromethane, tetrahydrofuran, or cyclohexanone may be used for the solvent to dissolve the poly methyl methacrylate. When evaporating the solvent, heat may be applied to the poly methyl methacrylate solution applied to a casting drum or a smoothly-shaped belt made of stainless steel.

Example 11

Extrusion Process

The transparent member 30 may be prepared through an extrusion process, for example, by combining a mixture of the red, green, and blue fluorescent transparent substances 21, 22, and 23 with a dissolved methyl methacrylate polymer so as to produce the transparent member 30. An extruder may combine the dissolved methyl methacrylate polymer with the mixture and then eject the methyl methacrylate polymer combined with the mixture from its T-shaped outlet. Next, the methyl methacrylate polymer combined with the mixture may be cooled so as to become solidified.

While the present disclosure has been described with respect to a limited number of embodiments, a person skilled in the art, having the benefit of this disclosure, would appreciate that other embodiments can be devised which do not depart from the scope of the present disclosure as disclosed herein. Accordingly, the scope of the invention should be limited only by the attached claims.

The invention claimed is:

1. A light guide structure comprising:
a transparent member containing at least one red fluorescent transparent substance, at least one green fluorescent transparent substance, and at least one blue fluorescent transparent substance, wherein the red fluorescent transparent substance comprises a europium complex, wherein the europium complex comprises a europium ion and at least one chemical compound having a phosphate group coordinated to the europium ion, and/or at least one chemical compound having a carbonyl group coordinated to the europium ion.

2. The light guide structure of claim 1, wherein the red, green, and blue fluorescent transparent substances are combined to enable the transparent member to emit white light in response to light applied thereto.

3. The light guide structure of claim 2, wherein the applied light has a wavelength to excite the red, green, and blue fluorescent transparent substances.

4. The light guide structure of claim 2, wherein
a ratio of the red fluorescent transparent substance to a combination of the red, green, and blue fluorescent transparent substances is from about 25% to about 65% by weight;
a ratio of the green fluorescent transparent substance to the combination of the red, green, and blue fluorescent transparent substances is from about 20% to about 60% by weight; and
a ratio of the blue fluorescent transparent substance to the combination of the red, green, and blue fluorescent transparent substances is from about 0% to about 40% by weight.

5. The light guide structure of claim 1, wherein the chemical compound having a phosphate group is selected from the group including: trimethyl phosphate, triethyl phosphate, tri-n-butyl phosphate, triphenyl phosphate and tritolyl phosphate.

6. The light guide structure of claim 1, wherein the chemical compound having a carbonyl group is selected from the group including: thenoyltrifluoroacetone, naphthoyltrifluoroacetone, benzoyltrifluoroacetone, methylbenzoyltrifluoro acetone, furoyltrifluoroacetone, pivaloyltrifluoroacetone, hexafluoroacetylacetone, trifluoroacetylacetone and fluoroacetylacetone.

7. The light guide structure of claim 1, wherein the green fluorescent transparent substance includes a terbium complex.

8. The light guide structure of claim 7, wherein the terbium complex includes a terbium ion and at least one chemical compound having a phosphate group coordinated to the terbium ion.

9. The light guide structure of claim 8, wherein the chemical compound having a phosphate group is selected from the group including: trimethyl phosphate, triethyl phosphate, tri-n-butyl phosphate, triphenyl phosphate and tritolyl phosphate.

10. The light guide structure of claim 7, wherein the terbium complex includes a terbium ion and at least one chemical compound having a carbonyl group coordinated to the terbium ion.

11. The light guide structure of claim 10, wherein the chemical compound having a carbonyl group is selected from the group including: thenoyltrifluoroacetone, naphthoyltrifluoroacetone, benzoyltrifluoroacetone, methylbenzoyltrifluoroacetone, furoyltrifluoroacetone, pivaloyltrifluoroacetone, hexafluoroacetylacetone, trifluoroacetylacetone and fluoroacetylacetone.

12. The light guide structure of claim 1, wherein the blue fluorescent transparent substance is selected from the group including: fluorescent organic dyes, bis-(triazinylamino-)stilbenedisulfonic acid derivative, bis stilbiphenyl derivative, 9,10-Dibromoanthracene, bis-(triazinylamino-)stilbenedisulfonic acid derivative, bis stilbiphenyl derivative, 2,5-bis (5-tert-butyl-2-benzoxazolyl)thiophene, tris (2-(2,4-difluorophenyl) pyridinate)iridium(III), bis(2-(2,4-difluorophenyl) pyridinate) picolinic acid iridium(III), tris(3,4,7,8-tetramethyl-1,10-phenantrolinato) iridium(III), and tris(2,9-dimethyl-4,7-diphenyl-1,10-phenanthrolinato) iridium(III).

13. The light guide structure of claim 1, further comprising a reflection layer arranged on one side of the transparent member.

14. An illuminating device comprising:
a light source configured to emit light; and
a light guide structure according to claim 1, configured to guide the light emitted by the light source, wherein the at least one red, green and blue fluorescent transparent substances are embedded within the transparent member, and wherein the light guide structure further comprises a reflection layer on a back surface of the transparent member and a light emission surface on a front surface of the transparent member,
wherein the light source is configured to emit ultraviolet light having a wavelength to excite the red, green, and blue fluorescent transparent substances.

15. The illuminating device of claim 14, wherein the reflection layer is a diffuse reflection layer arranged on one side of the transparent member, wherein the diffuse reflection layer has a plurality of dots which increase in density as the distance from the light source increases.

16. A method of manufacturing a transparent fluorescent substance for white light emission, the method comprising:
providing at least one red fluorescent transparent substance, wherein the red fluorescent transparent substance comprises a europium complex, wherein the europium complex comprises a europium ion and at least one chemical compound having a phosphate group coordinated to the europium ion, and/or at least one chemical compound having a carbonyl group coordinated to the europium ion;
providing at least one green fluorescent transparent substance;
providing at least one blue fluorescent transparent substance; and
combining the red, green, and blue fluorescent transparent substances to form a mixture of the red, green, and blue fluorescent transparent substances that emit white light in response to light applied thereto.

17. The method of claim 16, wherein
a ratio of the red fluorescent transparent substance to the mixture is from about 25% to about 65% by weight;
a ratio of the green fluorescent transparent substance to the mixture is from about 20% to about 60% by weight; and
a ratio of the blue fluorescent transparent substance to the mixture is from about 0% to about 40% by weight.

18. The method of claim 16, further comprising:
adding a monomer to the mixture; and
polymerizing the monomer to produce a transparent member that emits the white light in response to the applied light.

19. The illuminating device according to claim 14, wherein the red fluorescent transparent substance comprises a europium complex, wherein the europium complex comprises a europium ion and at least one chemical compound having a phosphate group coordinated to the europium ion, and/or at least one chemical compound having a carbonyl group coordinated to the europium ion.

* * * * *